United States Patent [19]

Berg et al.

[11] 4,033,395

[45] July 5, 1977

[54] CONTINUOUS PLASTIC TIRE BODY AND TIRE

[76] Inventors: Winfred M. Berg; Daniel T. Berg, both of 89 Grant Ave., E. Rockaway, N.Y. 11518

[22] Filed: Mar. 6, 1975

[21] Appl. No.: 555,783

[52] U.S. Cl. .............................. 152/323; 152/310; 152/327; 152/379.1

[51] Int. Cl.² ...................... B60C 7/00; B60C 7/12; B60C 7/24

[58] Field of Search .................. 152/157, 310–314, 152/323–325, 327–329, 318, 339, 379, 381, DIG. 12

[56] References Cited

UNITED STATES PATENTS

| 646,402 | 3/1900 | Kendall | 152/327 |
| 806,101 | 12/1905 | Bradley | 152/323 |
| 826,622 | 7/1906 | Swinehart | 152/324 |
| 1,169,984 | 2/1916 | Mettler | 152/327 |
| 1,414,478 | 5/1922 | McEwen | 152/318 |
| 1,576,024 | 3/1926 | Barrantes et al. | 152/324 |
| 1,622,546 | 3/1927 | Seiberling | 152/323 |
| 2,108,406 | 2/1938 | Kraft | 152/329 |
| 3,258,050 | 6/1966 | Nonnamaker | 152/DIG. 12 |
| 3,846,201 | 11/1974 | Huskins | 152/323 |

Primary Examiner—Drayton E. Hoffman
Attorney, Agent, or Firm—Edward Halle

[57] ABSTRACT

A tire suitable for all types of wheels, including vehicles and wheels, such as in automobiles, motorcycles or bicycles, in which the tire body is an extruded or molded plastic material formed in indeterminate length complete with conventional tread and shape means to fit the usual rim of a wheel. The tire is completed by cutting a length from the indeterminate length of tire body equivalent to the rim size of the wheel for which it is intended, then bonding the ends together. The finished tire may then be stretched and snapped on the wheel frame or rim.

30 Claims, 14 Drawing Figures

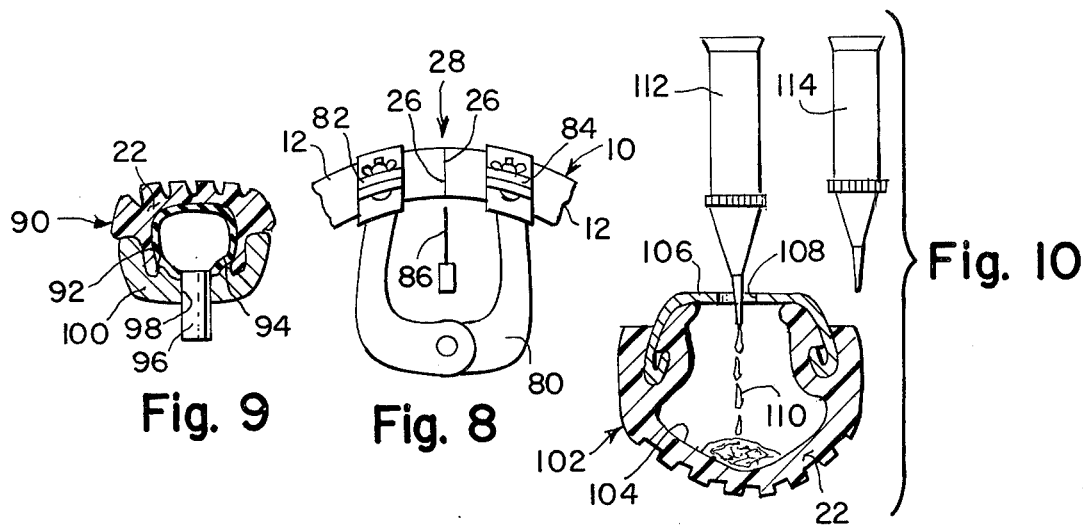
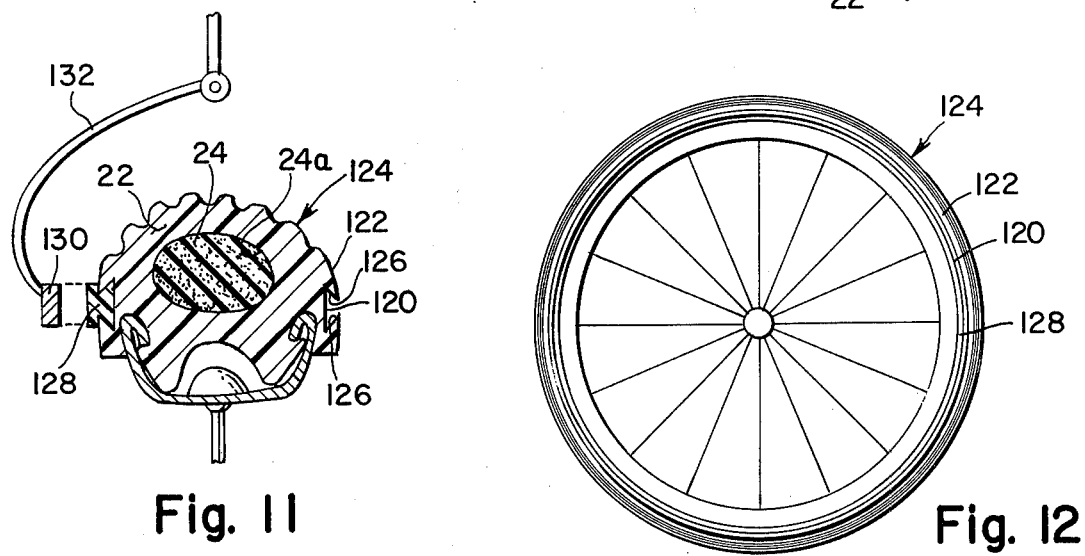
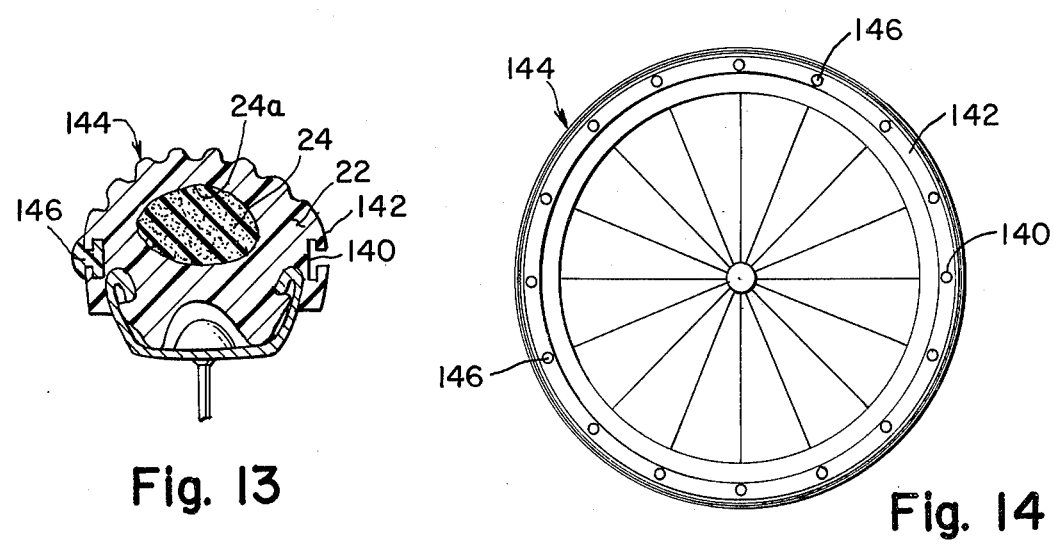

CONTINUOUS PLASTIC TIRE BODY AND TIRE

BACKGROUND OF THE INVENTION

Various types of tires, including solid tires, are well known in the art. A method for preparing solid tires which consists in making a continuous strip of tire stock, severing the strip and then placing the severed section around a rim to splice the cut edges to from a tire body is well known in the art, as described in prior U.S. Pat. No. 1,622,546 granted to G. W. Seiberling on Mar. 29, 1927. The method of U.S. Pat. No. 1,622,546 comprises the use of uncured tire stock. The uncured tire thus formed is then delivered to a mold and then vulcanized to form it into a finished tire. This may be done either off the wheel or on the wheel.

It is an object of this invention to provide a flat-less tire, made from a length cut from an indeterminate strip of tire body material, to be complete and ready for application to a wheel or rim. It is a further object of this invention to provide such a tire provided with an inner space for a conventional tire inner tube. A further object is to make such a tire in tubeless form as well as in solid and semi-solid form, and in a form comprising an inner core of soft foam material.

It is a further object to manufacture such a tire body strip of indeterminate length by means of an extrusion or molding process for extruding or molding the tire body strip out of plastic in finished form (including the threads). It is a further object of this invention to provide such an extruded plastic tire body which can be stored in reels and kept in a service station or bicycle shop or other retail outlet so that a vehicle such as a bicycle, motorcycle, automobile or the like, can be provided with a new or replacement tire from the continuous strip of material on the retail premises without the necessity of obtaining a completed tire from a factory or other distributor source.

Another object of the invention is to provide a tire body for a retail premises from which a number of wheel and rim sizes can be accommodated.

Further objects and advantages will appear in the specification hereinbelow.

BRIEF DESCRIPTION OF THE DRAWINGS

FIG. 8 is an elevational detail with parts cut away;

FIG. 9 is a similar view to FIG. 5 showing another form of tire with an inner tube;

FIG. 10 is an end view of a rim and tire body partly in section and with parts cut away and parts in exploded position;

FIG. 11 is a view similar to FIG. 6 showing a construction detail;

FIG. 12 is a side elevation;

FIG. 13 is a view similar to FIG. 6 showing a construction detail; and

FIG. 14 is a side elevation.

DETAILED DESCRIPTION OF THE INVENTION

Figure 1:
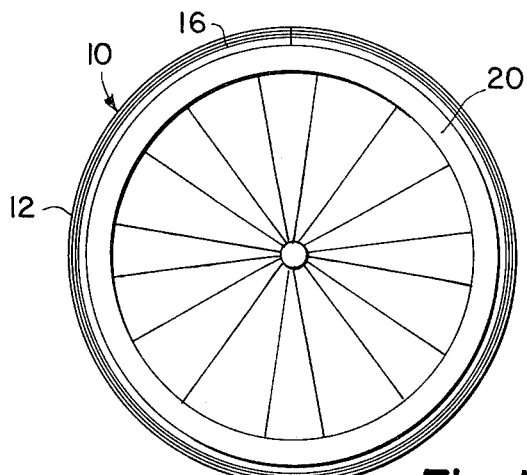
FIG. 1 is a side elevation of a wheel having a rim on which a tire of the invention is installed.
Figure 3:
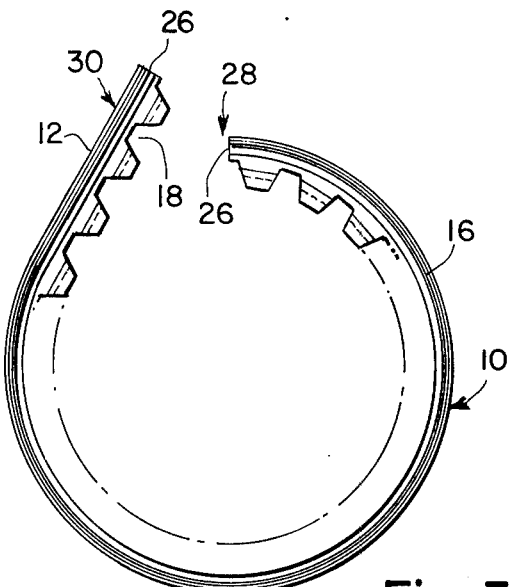
FIG. 3 is an elevational view showing a length of tire body material cut to fit the rim of the wheel of FIG. 1.
Figure 2:
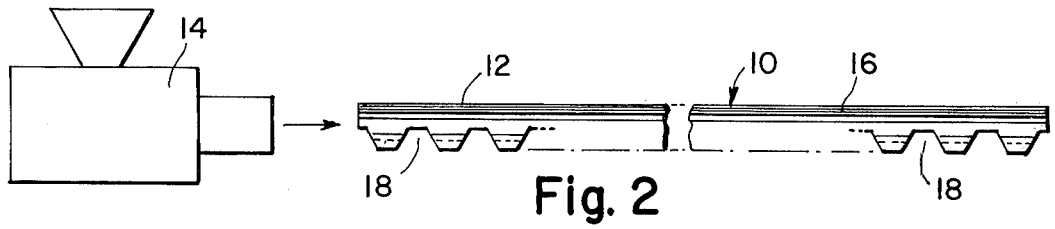
FIG. 2 is a side elevation of a strip of tire body material of the invention of indeterminate length and a diagrammatic representation of an extrusion or molding apparatus.

The invention relates to a tire 10 made of a tire body 12 comprising a relatively long, continuous strip of extruded or molded plastic material. The strip 12 is extruded or molded from any plastic extrustion or molding apparatus known to the art which may be suitable for the purpose. Such a device is represented at reference numeral 14 and has all of the necessary parts to accomplish its purpose whether they may or may not be shown. For example, the strip 12 is provided with tread means such as grooves 16. The grooves 16 may be formed by any type of mold or shaping device usual to extrusion or molding machines forming the grooves 16 as the material of the strip 12 is being extruded from the apparatus 14 or molded by it. The strip 12 in its preferred form is provided with spaces or notches 18 so that it may more easily be curved to fit a wheel rim 20. Reference to FIG. 3 will show a strip 12 in the process of being curved around to form a tire 10. As it is curved the material 12 at the inner part of the forming circle becomes compressed, the space means or notches 18 which form the inner part of the circle of the tire 10 relieve this compression and make for a better fit of the strip 12 against or within the rim 20. The notches 18 are formed within the apparatus 14 or by an auxiliary machine not shown, which may be in the form of a rotary mold attached to the exit or associated with the exit of the extrusion machine 14, to form the notches 18. Such apparatus are well known in the art and need not be explained.

A process which comprises the use of such wheels or rollers is described in U.S. Pat. No. 3,555,601 granted to Harold Price on Jan. 19, 1971. The tread means or grooves 16 can also be made by such an extrusion process which comprises an embossing roller to make the tread pattern in the strip 12. Instead of having a grooved tread pattern, the tread pattern may be of any type or pattern which may be applied by such an embossing roller. It is understood that any extruding or molding process known to the art may be incorporated in the invention.

The preferred material for the strip 12 and the finished tire 10 is a soft, flexible, spliceable, urethane material which has the characteristics of being shock and vibration resistant, has an operational temperature of $-20°$ to $+150°$ F., maintains its conventional stability and has a high co-efficient of friction (0.5 to 0.7, in its preferred form, which produces excellent driving qualities). Although the above described urethane is preferred, any type of plastic, or synthetic material, or any material capable of being extruded or molded for the invention may be used.

A tire 10 of the invention may be made of urethane material 22 exclusively, or, if desired, a second softer material such as flexible nylon may be used to improve the cushioning and riding qualities of the tire. Such examples are found in FIG. 5, 6, 7, 11 and 13 of the drawings. These tires may differ in their physical shapes, however they have in common the use of an outer material 22 and an inner softer durometer material 24. The inner material 24 can be extruded or molded within a strip 12 in any manner known to the art so that the extrusion will in cross section resemble the tire shown in FIGS. 5, 6, 7, 11 and 13.

Figure 4:
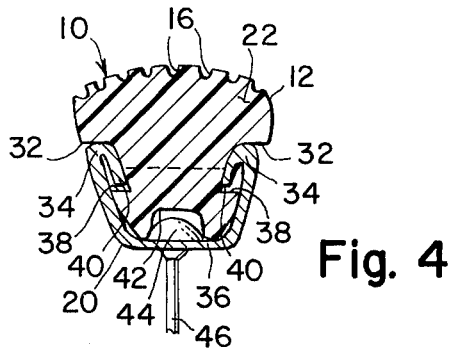
FIG. 4 is a cross section through the rim portion and tire body installed on a wheel.

In FIG. 4 a cross section of a tire 10 is shown in which the body of the tire comprising material 22, as described hereinabove, is shaped in a cross section to provide not only the tread portion 16, but also a pair of shoulders 32 adapted to fit on the outer edges 34 of a rim 20 which has a U-shaped cross section. In addition, tire 10 has a pair of shelves 38 positioned to fit underneath or within internal rim ends 40. An underneath groove 42 is supplied to fit the bottom edge of the strip 12 against the inner end of the rim and provide spacing for the end rivet 44, or such other means as may be used to attach the spoke 46 to the rim 36. The tire 10 is made as described hereinabove by first preparing a strip 12 of tire body portion having the materials and cross sectional dimension illustrated and described in FIG. 4 hereinabove. Then a strip of body portion 30 sufficient to encircle the wheel to be fitted with a tire 10 is cut and placed in position and spliced together by splicing ends 26 together at point 28 (FIG. 3).

Material 22, which may be of urethane, has sufficient resiliency after splicing so that it may be forced onto the rim 20, by stretching and snapping over the rim 20. The shelves 38 will pass the inner rim ends 40 being compressed and then spring outwardly to hold the tire 10 in place. The notches 18 help provide the fit within the rim 20.

Figure 5:
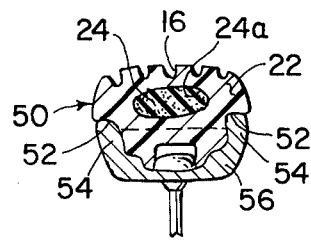
FIG. 5 is a view similar to FIG. 4 showing another form of wheel rim and tire.

In FIG. 5 another form of tire 50 is shown which also has shoulders 52 to fit over rim ends 54 of rim 56. However, tire 50 does not have a lower body construction similar to tire 30. In tire 50 the lower body comprises a curve to fit and conform to the curve of the inner part of the U-shape of rim 56. In all other respects the tire 50 is substantially similar to tire 10 and may even have a groove underneath the body to accommodate rivet or fastening ends of the spokes, such as groove 42 of tire 30. Tire 50, as well as the other tires described herein, may include the softer inner core material 24. This is preferred to be a foamed plastic material.

Figure 6:
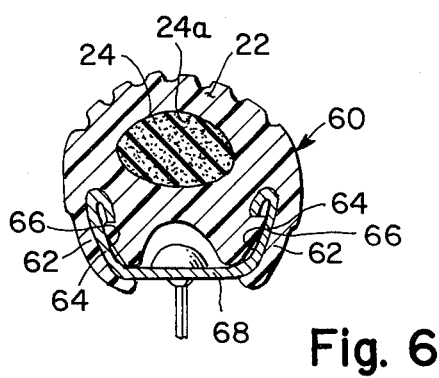
FIG. 6 is a view similar to FIG. 4 showing another form of tire.

In FIG. 6 a tire 60 is shown which is substantially similar to tire 10 shown in FIG. 4, with the exception that instead of having plain shoulders 32 as tire 10, the form of tire shown in FIG. 6 has a pair of overlapping lips 62 which may be formed in the body portion 12 as it is being extruded or molded. The lips 62 are designed to fit around the sides 64 and partially over the underside or inner surface 66 of the rim 68. The material 22 of tire 60 has sufficient flexibility to be forced into position on the rim 68 and to put the lips 62 in place, as shown in FIG. 6 of the drawings. Tire 60 may also have an optional softer core 24.

Figure 7:
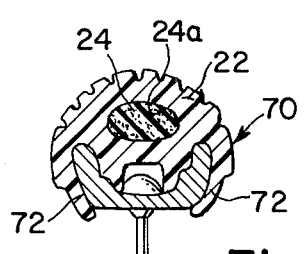
FIG. 7 is a view similar to FIG. 5 showing another form of tire.

In FIG. 7 of the drawings another form of tire is shown which is substantially similar to the tire shown in FIG. 5, except that tire 70 is provided with overlapping lips 72 similar to the lips 62 of tire 60. While preferred forms of the invention have been shown for tires adapted to be placed on rims having U-shaped cross sections, it is readily understood that tires of the invention may be made for positioning on rims of other cross sectional types. For example, a tire of the invention can be made for a flat rim by providing overlapping lips such as lips 62 or 72 to fit around the rim in cross section similar to views 6 and 7 of the drawings.

All of the tires of the invention may be spliced in the following manner. Reference is made to FIG. 3 of the drawings where strips 12 are shown having two free ends 26. The ends 26 are brought around to abut at 28 to form a seaming or splicing abutment. Reference is now made to the diagram of FIG. 8 of the drawings which shows a clamp 80 having grips 82 and 84 applied on either side of the abutting splice 28. Reference numeral 86 depicts a hot thin blade which is inserted in the splicing abutment area 28 between ends 26 to head the ends 26. This may be done after the clamp 80 and its grips 82 and 84 are placed in position. When the hot blade 86 is removed the clamp 80 remains in position until the splice 28 cools and is formed in the material of the tire 10. The completed tire, such as 10, after splicing, is placed on its rim, such as 20, as aforesaid. The form of splice defined is by way of illustration and any type or manner of splice ends 26 can be employed.

Reference is now made to FIG. 9 of the drawings in which a tire 90 is made in the described manner of the invention, in a shape which provides for an inner longitudinal space 92 within the tire body strip, which forms an annular space for an inner tube ;94 in the completed tire 90. Inner tube 94 may have valve 96 which fits through valve opening 98 in rim 100.

In FIG. 10 of the drawings a tire 102 of the invention, similar to that shown in FIG. 9, is presented. Tire 102 has an inner space 104 similar to space 92. Tire 102 is spliced together and snapped on to rim 106 which has an opening 108 (such as the usual type of valve opening in a wheel rim, see 98). However, tire 102 in combination with rim 106 does not use a valve and does not have an inner tube. The inner space 104 is filled with a foamed plastic made by injecting plastic material, such as polyurethane 110, into the space 104 for foaming to fill in space 104. There are plastics, for example two component flexible polyurethane foam systems provided, A and B, which may be stored separately in containers such as tubes 112 and 114, respectively. When the separate A and B components are mixed a foaming action will result and a flexible foamed plastic material will result which will fill the space in which it is foamed. Thus, when both components A and B are injected from tubes 112 and 114 into the tire cavity 104 through the rim stem hole 107, the material will foam up and fill all the available cavity space 104 and supply an inner foamed core in space 104 made of the plastic 110. The desired tire hardness (durometer) can be made by varying the amount of the A and B components. Examples of such flexible foam material are made by CPR Division, The Upjohn Company, 555 Alaska Avenue, Torrance, Calif. 90503, and sold under the trademark ISONATE SYSTEM CPR 1936 and 1936D. These flexible foam systems can be hand mixed or processed in any standard variable two component metering and mixing equipment.

| CHEMICAL COMPONENTS | CPR 1936 | CPR 1936D |
| --- | --- | --- |
| COMPONENT A | | |
| Viscosity at 77° F temp. | 304 cps | 340 cps |
| Specific Gravity at 77 F° temp. | 1.17 ± 0.01 | 1.17 ± 0.01 |
| COMPONENT B | | |
| Viscosity at 77° F temp. | 920 cps | 910 cps |
| Specific Gravity at 77° F temp. | 1.01 ± 0.02 | 1.00 ± 0.02 |
| RATIOS: | | |
| Component A | 46 parts by weight | 45 parts by weight |
| Component B | 54 parts by weight | 55 parts by weight |

The above ratios must be weighed or metered to an accuracy of ± 2%.

MACHINE SET UP 1936 and 1936D can be processed by hand or in any standard variable two component metering and mixing equipment.

| "A" COMPONENT | 75 F ± 3 | Recommended temperature |
|---|---|---|
| "B" COMPONENT | 110 F ± 5 | Recommended temperature |
| REACTION RATIOS: | CPR 1936 | CPR 1936D |
| Cream time | 4–6 sec. | 3–5 sec. |
| Rise time | 1 min. | 1 min. |
| Tack free time | 1 min, 30 sec. | 1 min, 30 sec. |
| Setting time | 6–10 min at preheat of 105° F + 5° F | 6–10 min at preheat of 105° F ± 5° F |
| Density (free rise) | 2.5–3.0 lbs/ft³ (nominal) | 2.5–3.0 lbs/ft³ (nominal) |

PREPARATION

Tire cavity 104 should be free of all traces of grit or other foreign matter and be preheated to a temperature of 105° F. Lower temperatures will result in higher densities and longer setting times.

CURING

Foam will cure at room temperature, however, higher physical properties will result if cured for 30 minutes at 250° F.

NOTE:
Store components at 70° to 90° F.

| PHYSICAL PROPERTIES | TEST METHOD | CPR 1936 | CPR 1936D |
|---|---|---|---|
| Nominal Density | ASTM D1564 | 2½ 3 lbs/ft³ | 2½ 3 lbs/ft³ |
| Tensile Strength, psi. | ASTM D1564 | 15 | 13 |
| Tear Strength, pli | ASTM D1564 | 1.0 | 0.65 |
| Elongation, % | ASTM D1564 | 147 | 125 |
| Compression Set at 90% | ASTM D1564 | 4.0 | 4.0 |
| ILD (Initial Load Deflection) | ASTM D1564 | | |
| 25% | | 20 | 23 |
| 65% | | 66 | 64 |
| Ball Rebound % | ASTM D1564 | 50 | 58 |

In all of the tires described herein the center core of material, such as material 24 or foamed polyurethane 110, can be varied with hardness or softness to the hardness or softness of the outer material 22 to provide a completed tire simulating various tire pressures of the usual types of air filled tires used on bicycles, motorcycles or automobiles. In addition, the center core, such as core 24a, of any of the tires of the invention may comprise an enclosed pocket of air or other gas or liquid in combination with or instead of the material 24. Other combinations of materials including more than two materials may be employed in the invention as claimed. The outer material 22 can be molded in various colors to enhance the esthetic appeal of the appearance of any of the tires.

In FIG. 11 a keyed strip receiver 120 is molded into the side walls 122 of a tire 124. The key portion is supplied by tapered sections 126. An annular strip 128 having an inner configuration to fit the keyed channel 120 is then pressed into the tire 124. Strip 128 may be of flexible steel or plastic and will serve as a brake band for a brake shoe 130 operated by a rod 132, or any other brake operator known to the art.

In FIG. 13 of the drawings a keyed molding 140 is made in a plurality of places along the side walls 142 of a tire 144. This type of molding is similar to the strip receiver in tire 124 except that it is made for individual installations rather than for a long annular strip. Plastic reflectors 146 having a configuration to fit the key of the molding 140 may be snapped into place, thereby creating a tire having a plurality of reflectors 146 visible from the side of the vehicle for safety purposes. Thus the tire of the invention may be used in combination with snapped-in brake band material 128 and also safety light reflectors 146, or any other suitable accessory means.

Many treat patterns can be incorporated into the tire of the invention. The geometric pattern of the tread can be simple as shown in the drawings, or as desired to provide a "non-skid" or "all weather" tread type.

Various rim forms have been shown. These have been selected as being the usual type of rim forms associated with bicycle wheels and are shown by way of illustration. The invention is adapted for use with many different types of rim forms other than those shown.

While we have described our invention in its preferred forms, there are many forms which it may take in addition and we therefore desire to be protected for all forms coming within the claims hereinbelow.

Wherefore we claim:

1. A tire, sized to be stretch-snapped over a rim, comprising a selected cut portion of tire body material in finished form, having a first end and a second end, said selected cut portion having been cut from a strip of flexible heat spliceable plastic tire body material of indeterminate length comprising tread means and rim fit means, said selected cut of material having been curved into an annular shape with said first end and said second end held in abutting relationship and spliced with means comprising a thin hot blade held temporarily between said abutting ends.

2. The tire as claimed in claim 1, in which the tread means comprise a tread pattern and the rim fit means is shaped in cross section in at least one portion to conform to at least one portion of the cross section of a wheel rim.

3. The tire as claimed in claim 2, in which the tread pattern comprises at least one longitudinal groove.

4. The tire as claimed in claim 3, in which the surface of the tread pattern forms a plurality of geometric pattern details.

5. The tire as claimed in claim 2, in which tread pattern comprises a plurality of recessed areas.

6. The tire as claimed in claim 2, in which the rim fit means comprises shoulder element means positioned for contacting relationship to the edge means of the rim for which it is intended.

7. A tire as claimed in claim 6 in which the rim fit means is further shaped in cross section to include shelf element means positioned to extend laterally and be in spaced facing position to the shoulder means.

8. A tire as claimed in claim 7, in which there are spaces in the rim fit means.

9. A tire as claimed in claim 8 comprising a plurality of materials.

10. A tire as claimed in claim 8 comprising a plurality of materials of different durometers.

11. The tire as claimed in claim 2, in which the rim fit means is shaped in cross section to include shelf element means positioned to extend laterally and in facing relationship to inner rim edges of a wheel rim having a U-shaped inner cross section.

12. The tire as claimed in claim 1, in which the rim fit means comprises means to fit within the U-shaped portion of a rim in combination with lip means provided to overlap the outer portion of a rim.

13. The tire as claimed in claim 2 comprising a medial longitudinal groove in the rim fit portion located to be in facing relationship to the inner medial portion of a rim.

14. The tire as claimed in claim 2 comprising at least one outer side wall cavity.

15. The tire as claimed in claim 14, in which the cavities comprise snap-in accessories.

16. The tire as claimed in claim 15, in which the accessories are reflector means.

17. The tire as claimed in claim 14, in which the outer side wall cavity is continuous.

18. A tire as claimed in claim 17 which comprises an annular braking means in the cavity.

19. The tire as claimed in claim 1, in which the tread means comprises a tread pattern and the rim fit means comprises lip means to overlap the outer portions of a rim.

20. The tire as claimed in claim 2, in which the body material is provided with transverse spaces in the rim fit means.

21. The tire as claimed in claim 20, in which the spaces are in the form of notches.

22. The tire as claimed in claim 1, made of a single principal material.

23. The tire as claimed in claim 1, made of a plurality of materials of different durometers.

24. The tire as claimed in claim 1 comprising an outer material surrounding at least one air pocket.

25. A tire as claimed in claim 1, in which the outer portion of the tire body is made of a first material which covers at least partially a core made of a second material.

26. A tire as claimed in claim 1, in which the second material core is completely enclosed by the first material.

27. A tire as claimed in claim 1 being stretched and snapped over to fit in combination with a wheel rim, comprising an inner core made of foamed material.

28. A tire as claimed in claim 27, in which the inner core foamed material has been formed from a supply of plastic material having the property of foaming upon application after the tire was stretch-shaped over the rim.

29. A tire as claimed in claim 38, in which the supply of plastic material is in a plurality of portions which foam when mixed together for application.

30. A tire as claimed in claim 1, in which the means for holding said ends in abutting relationship during the heat splicing with the thin hot blade comprises a clamp.

* * * * *